US012548724B2

(12) United States Patent
Besnard

(10) Patent No.: US 12,548,724 B2
(45) Date of Patent: Feb. 10, 2026

(54) MAGNETIC PUSH-BUTTON HAVING A FIXED BODY AND A MOVABLE BODY

(71) Applicant: THALES, Courbevoie (FR)

(72) Inventor: Mathieu Besnard, Merignac (FR)

(73) Assignee: THALES, Courbevoie (FR)

( * ) Notice: Subject to any disclaimer, the term of this patent is extended or adjusted under 35 U.S.C. 154(b) by 216 days.

(21) Appl. No.: 18/316,457

(22) Filed: May 12, 2023

(65) Prior Publication Data

US 2023/0377821 A1 Nov. 23, 2023

(30) Foreign Application Priority Data

May 17, 2022 (FR) ...................................... 22 04661

(51) Int. Cl.
*H01H 50/16* (2006.01)
*H01H 13/14* (2006.01)
*H01H 50/02* (2006.01)

(52) U.S. Cl.
CPC ............ *H01H 50/16* (2013.01); *H01H 13/14* (2013.01); *H01H 50/02* (2013.01)

(58) Field of Classification Search
None
See application file for complete search history.

(56) References Cited

U.S. PATENT DOCUMENTS 3,622,922 A 11/1971 Mogi
3,858,145 A * 12/1974 Sulich .................. H01F 7/0252 335/215
3,873,957 A * 3/1975 Wurscher .............. H03K 17/90 335/207
4,644,315 A 2/1987 Hodges

FOREIGN PATENT DOCUMENTS

CH 669 076 A5 2/1989
WO WO 2019/091611 5/2019

OTHER PUBLICATIONS

Preliminary Search Report for FR 2204661 dated Nov. 23, 2022.

* cited by examiner

*Primary Examiner* — Bernard Rojas
(74) *Attorney, Agent, or Firm* — B. Aaron Schulman, Esq.; Stites & Harbison, PLLC

(57) ABSTRACT

The present invention relates to a magnetic push-button (10) comprises a fixed body and a body which is movable with respect to the fixed body along an axis of movement (X);

one of the bodies, called first body (21), comprising:

- a magnetic element extending along the axis of movement (X) and defining a magnetic alternation along the axis of movement;

the other body, called second body (22), comprising:

- a notching tooth made of ferromagnetic or magnetic material arranged opposite the magnetic element so as to create a push force by magnetic cooperation with the magnetic element, during a movement of the movable body (21) along the axis of movement (X);
- a magnetic detector placed opposite the magnetic element and configured for generating measurements quantifying each movement of the movable body along the axis of movement (X).

14 Claims, 10 Drawing Sheets

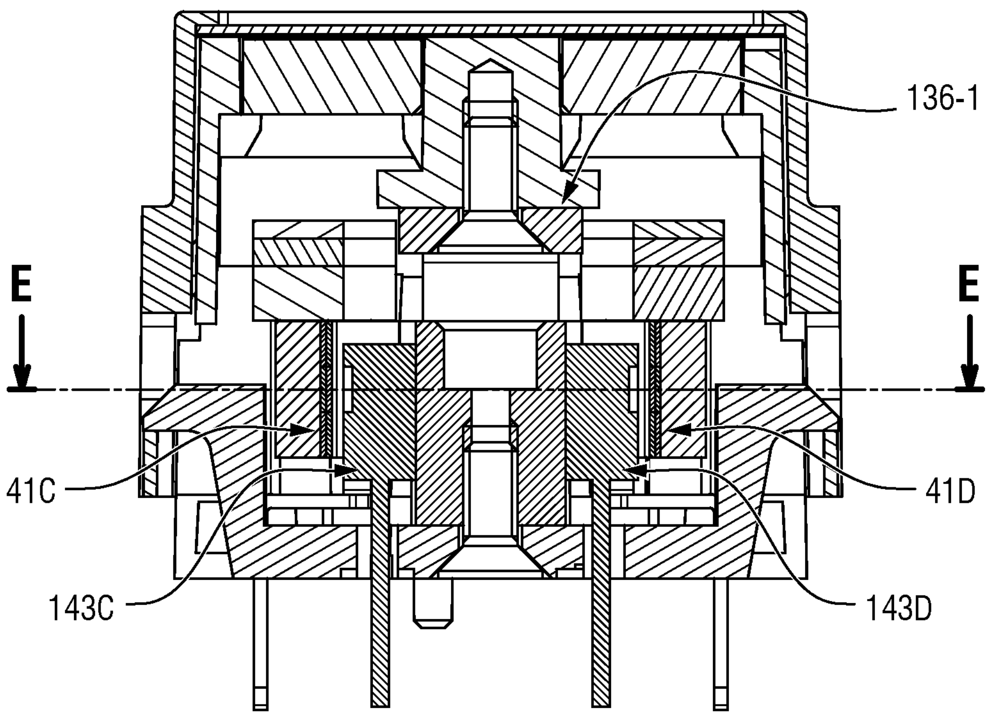
FIG.9
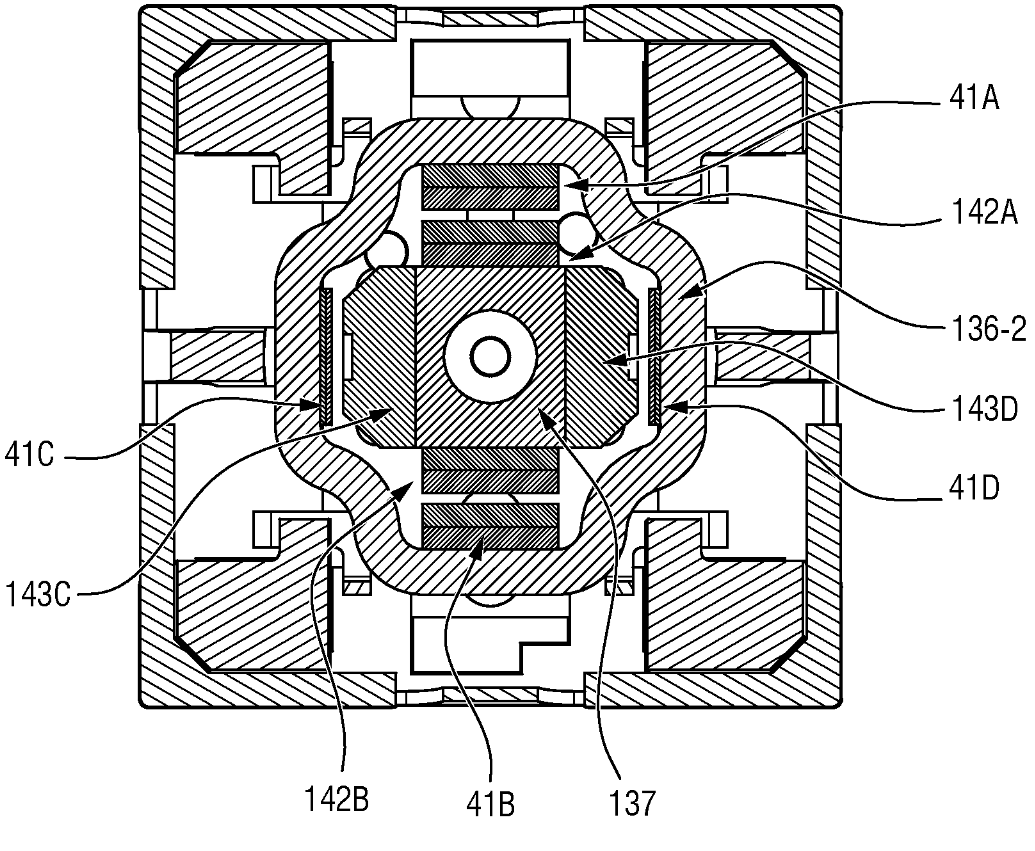
E-E

MAGNETIC PUSH-BUTTON HAVING A FIXED BODY AND A MOVABLE BODY

FIELD OF THE INVENTION

The present invention relates to a magnetic push-button, also called a magnetic push-button switch.

More particularly, the present invention relates to the field of single-function push-button switches, or switches with a redundant or secure function, intended for switching on critical functions. Advantageously, such a button can be used in the aeronautical field, e.g. in an aircraft cockpit.

BACKGROUND OF THE INVENTION

Such type of electrical switch intended for switching on critical functions, used e.g. on aircraft instrument panels, has to meet a number of requirements. In particular, to become operational, certain functions require a pressing on a redundant or electrically safe switch, i.e. simultaneously establishing electrical contact for at least two electrical circuits implementing e.g. a single function, the two electrical circuits not having a common electrical mode.

Such is the case e.g. in aircraft, for switch-on switches of an automatic pilot device (PA). For such applications, it is also preferable for the switches arranged on the instrument panel to have a compact structure. Furthermore, it is desirable that the switch provides a pleasant tactile feel to a user during an action on the switch and returns a feedback information enabling the user to confirm the successful completion of the action initiated. The push force for such a switch has to be between 0.5 and 20 N (typically 5 N). In order to allow the certification thereof, the push-button switch should be also able to meet high DALs (Design Assurance Level), especially at DAL A. In such a device, it is sought to generate a maneuvering pleasure (or tactile feel) the main function of which is to guarantee that an electrical detection (for validation) is ensured after overcoming a peak of force (notching force). For a good tactile feel, the travel of the button should be long, e.g. greater than or equal to 0.3 mm.

In particular, with regard to compactness, a magnetic push-button switch can have the following dimensions:

- height (dimension along the direction of movement): between 5 and 20 mm (typically: 12 mm);
- width: between 10 and 38 mm (up to 70 mm in some cases, typically: 14 mm);
- length: between 10 and 38 mm (up to 70 mm in some cases, typically: 14 mm).

Such dimensions can e.g. be determined according to a standard such as MIL-STD-1472.

To meet the above-mentioned needs, there are electromechanical solutions based on domes (or equivalent). However, such solutions remain complex assemblies consisting of many high-precision parts. Domes are exposed to the risk of fatigue and fretting corrosion, which limits the lifetime of the device. Moreover, the travel of a dome switch is rarely greater than 0.3 mm. Hence, such switches do not meet all the requirements of the need.

Magneto-mechanical solutions are also known which ensure a detection of activation by magnetic effects and a push and/or return force by means of an elastic element, such as a spring. However, such an elastic element carries risks of fatigue and of jamming or offset, which also limits the service life of the device.

SUMMARY OF THE INVENTION

The goal of the present invention is to propose a magnetic push-button meeting all the above-mentioned needs, while having a detection function, a push force and, if appropriate, a return force without friction and without wear, with a limited number of parts, a simplified assembly and reduced risk of jamming and misalignment.

To this end, the invention relates to a magnetic push-button comprising a fixed body and a movable body which is movable with respect to the fixed body along an axis of movement;

One of the bodies, called first body, comprises a magnetic element extending along the axis of movement and defining a magnetic alternation along the axis of movement.

The other body, called second body, comprises a notching tooth made of ferromagnetic or magnetic material arranged opposite the magnetic element in order to generate a push force by magnetic cooperation with the magnetic element, during a movement of the movable body along the axis of movement, and a magnetic detector disposed opposite the magnetic element and configured for generating measurements quantifying each movement of the movable body along the axis of movement.

Provided with such features, the push-button according to the invention is used for implementing a detection function and a push force which are generated by the same magnetic effect between the movable body and the fixed body. Thereby, the arrangement of the two bodies can be chosen so as to minimize the mechanical contact, hence the wear. E.g., the above detailed elements of the fixed body and of the movable body have a minimum contact needed for ensuring the movement of one body with respect to the other. Thereby, such elements operate substantially without friction and without premature mechanical wear. The above guarantees the reliability of the use of the button and considerably extends the service life thereof even when plastic parts are used. Moreover, such elements are limited in number, which makes it possible to arrange same easily within the corresponding bodies.

The above makes the mounting of the button particularly easy and reduces the risks of blocking and of shifting of different parts from one another.

According to certain embodiments of the invention, the magnetic element defines at least one central notch and two peripheral notches and a position which is stable in translation, being defined when the notching tooth is arranged opposite the central notch.

Due to such features, the magnetic element has three magnetic alternations and the notching tooth preferentially has a magnetization for an attraction to the central notch of the magnetic element. The above thus generates a stable position centered in the middle of the travel of the push-button which intrinsically has a return to the stable position by means of a contactless magnetic return. The advantage of the magnetic arrangement is to prevent wear and use, in both directions of translation, of any elastic element, so as to provide a return force.

According to certain embodiments of the invention, the magnetic alternation of the magnetic element defines a notching pitch.

Due to such features, the stable position is positioned on the central notch and the force profile of the push starts substantially at 0 N without pre-load (target for a force profile with improved tactile feel).

According to certain embodiments of the invention, the surface of the notching tooth has an extent less than or equal to the notching pitch of the magnetic element.

Due to such features, the magnetic alternation of the magnetic element corresponds to the size of the notching tooth and defines the translational travel of the push-button.

The translational travel is e.g. greater than or equal to 0.3 mm. Provided with such features, the number of teeth can thus be increased until reaching a number of 41 magnetic alternations. It is in this way possible to optimize the notching or push effort.

According to certain embodiments of the invention, the invention has a detection profile for the button activation based on the measurements generated by the magnetic detector; said detection profile comprising a detection of activation of the button with an offset with respect to a peak of the push force generated by magnetic cooperation between the magnetic element and the notching tooth.

Such features provide an improved tactile feel. More particularly, in such a case, it is sought to generate a tactile feel the main function of which is to guarantee that the detection of activation is ensured after overcoming a peak of force (push force). The above corresponds to a tactile feel usually felt by the user when activating a conventional push-button.

According to certain embodiments of the invention, said offset in the detection profile is achieved by an offset along the axis of movement of the magnetic detector and of the notching tooth.

Due to such features, the offset between the peak of the pushing force and the detection of the button activation can be achieved in a particularly easy way. Indeed, the magnetic detector can simply be slightly shifted along the axis of movement with respect to the notching tooth, which ensures a detection slightly offset with respect to the peak of the push force.

According to some embodiments of the invention, the second body comprises a plurality of notching teeth and/or a plurality of sensors distributed equidistantly along the axis of movement and/or about the axis of movement.

Due to such features, the increase in the number of teeth is used for increasing the desired push force. Such increase can be made simultaneously with the increase in the surface area facing the magnetic element or with the increase in the number of different parts of the magnetic element.

According to certain embodiments of the invention, the or each notching tooth and/or the magnetic element is (are) mounted on a magnetic or ferromagnetic support.

Such features prevent field leakage and external parasitic emissions, without increasing the size of the corresponding element. Hence, such features optimize the notching or push effort.

In certain embodiments, the first body is the movable body and the second body is the fixed body.

In such a case, the magnetic detector and the notching tooth stay fixed. The above is advantageous insofar as the electrical cable coming in particular from the magnetic detector stays fixed with respect to the body of the button. The above avoids complicated wiring which is usually expensive and carries risks of wear and of signal interruption.

According to certain embodiments of the invention, a travel stop for each travel end during movement along the axis of movement.

Each stop could be mechanical (i.e. mechanical contact) or else magnetic. In the latter case, such a stop could comprise repulsive magnets at the end of travel.

According to certain embodiments of the invention further comprise a surface intended for being oriented towards an operator; said surface comprising at least one functional element selected from the list comprising:

an element of visual feedback;

a presence sensor;

a haptic actuator.

Due to such features, it is possible to provide a number of additional functions of the button. E.g. it is possible to implement a visual feedback indicating e.g. to the operator the current state of the function associated with the button (activated or deactivated) or any other useful information, such as e.g. the function assigned to the button.

By means of the presence sensor, it is possible e.g. to activate additional functions of the button by detecting the position of the fingers on the button. E.g., the functions of the button could differ depending on the number of fingers on the button.

By means of a haptic actuator, it is possible to improve the haptic feeling felt by the user.

According to certain embodiments of the invention further comprising a supplementary force controller comprising an electromagnetic coil rigidly attached to one of the bodies and configured for acting on the or each notching tooth and/or on the magnetic element and/or on a ferromagnetic or magnetic support.

Due to such features, it is possible to increase the pushing force felt by the operator.

According to certain embodiments of the invention, the button further comprises an additional electromechanical or opto-mechanical switch placed in the center of the second body and configured for being activated by a rod rigidly attached to the first body.

Due to such features, it is possible to increase the safety level of the device by means of the switch forming a detector with a different technology compared to the magnetic detector. Such a detector can e.g. form a so-called "dry contact" detector (i.e. mechanical contact) or else an optical detector.

BRIEF DESCRIPTION OF FIGURES

The features and advantages of the invention will appear upon reading the following description, given only as an example, but not limited to, and making reference to the enclosed drawings, wherein:

FIG. 9 is a view along a longitudinal section of the push-button shown in FIG. 8 and along a transverse section along the arrows E-E on same figure.

DETAILED DESCRIPTION OF THE INVENTION

First Embodiment

Figure 1:
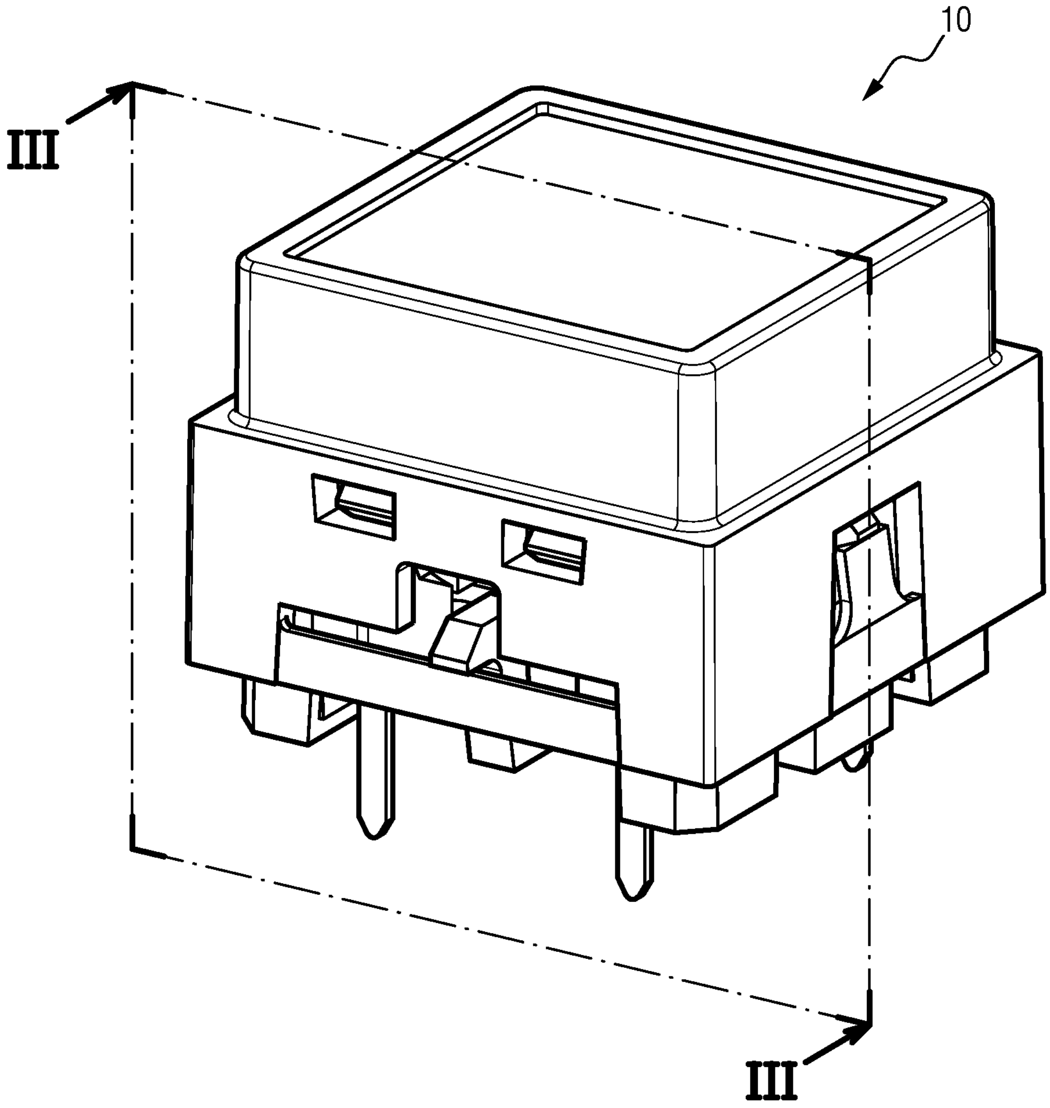
FIG. 1 is a perspective schematic view of a push-button according to a first embodiment of the invention.

FIG. 1 shows a magnetic push-button 10 according to the first embodiment of the invention. Preferentially, the button 10 is mounted in a cockpit used for piloting an aircraft.

"Aircraft" means any flying device, such as e.g. an airplane, a helicopter or a drone. Such an aircraft can be piloted directly from the cockpit. In such a case, the cockpit is advantageously arranged inside the aircraft. According to another example of embodiment, such an aircraft is controlled remotely. In such a case, the cockpit is arranged at a distance from the aircraft and has e.g. a ground station. In all cases, the aircraft is configured for being piloted by an operator, also called user, e.g. by a pilot from the cockpit located inside the aircraft.

According to the invention, the button 10 is used by the operator for controlling at least one avionic function. E.g, such a button 10 can be used by the operator for controlling an avionic system and forms part of a control system of such an avionic system. As a variant, the button 10 is part of a control system for a plurality of avionic systems. E.g. the button 10 according to the invention is part of a system called "Flight Control Unit" (FCU) or "Integrated Standby Instrument System" (ISIS) or "Closer Control Device" (CCD) or "Keyboard Cursor Control Device" (KCCD), etc.

Figure 2:
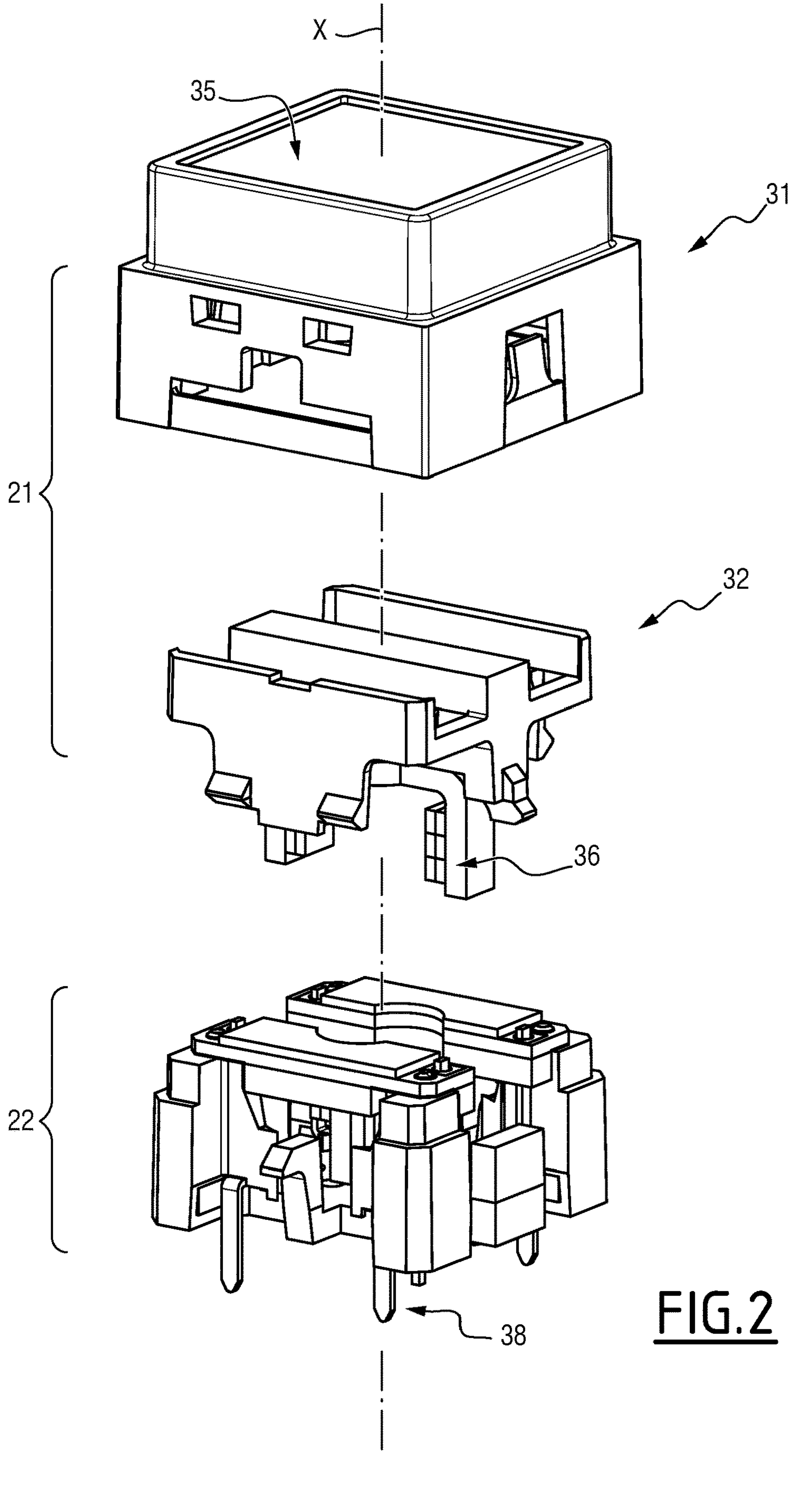
FIG. 2 is an exploded perspective view of the button shown in FIG. 1.

With reference to FIG. 2, the button 10 comprises a movable body 21, also called, in the example shown in the figure, first body, and a fixed body 22, also called, in the example shown in the figure, second body. The movable body 21 is movable in translation with respect to the fixed body 22 along an axis of movement X also visible in FIG. 2.

The movable body 21 comprises a cover 31 and an interconnection element 32. The cover 31 protects all the internal elements of the button 10 and comprises in particular, a visible surface 35 intended for being oriented towards the operator. According to different embodiments, the cover 31 can comprise linking means for cooperating with the fixed body 22 during the movement thereof along the axis of movement X. According to other embodiments, such linking means are part of the interconnection element 32. The linking means ensure e.g. a sliding link or pivot link sliding along the axis of movement X. The link can be:

- plain bearings (e.g. polymer bearings or sintered bronze bearings) preferentially with flanges for serving as mechanical stop;
- rolling element bearings (example: ball bushings);
- links with flat surfaces (example: dovetail).

As a variant or in addition, at least some of such means of linking means are integrated into the fixed body 22.

As a variant or in addition, the linking means between the bodies 21 and 22 can be an elastic body with an equivalent stiffness. The stiffness can be different depending on the directions, e.g. weak along the X axis and strong along the other directions in order to counter parasitic torques when the button is pressed at an angle. Such type of link can thus be with no contact nor rolling between the bodies 21 and 22. Such type of link can be:

- one (or a plurality of) membrane(s) (e.g. CuBe2 plates or elastomer membrane).
- one (or a plurality of) plated deformable part(s) placed in the center (or around the bodies 21 and 22).

Figure 3:
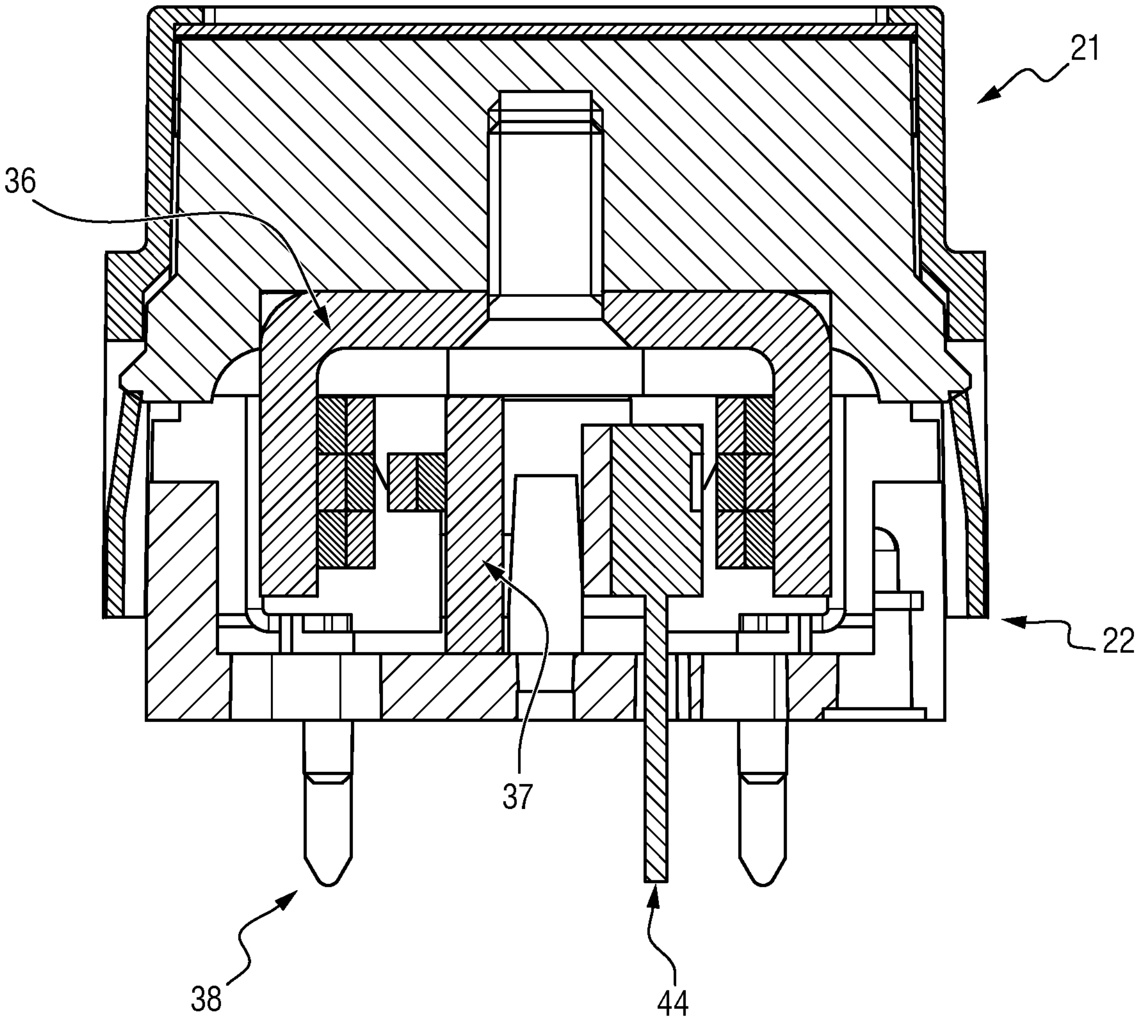
FIG. 3 is a section view along the plane III shown in FIG. 1.
Figure 4:
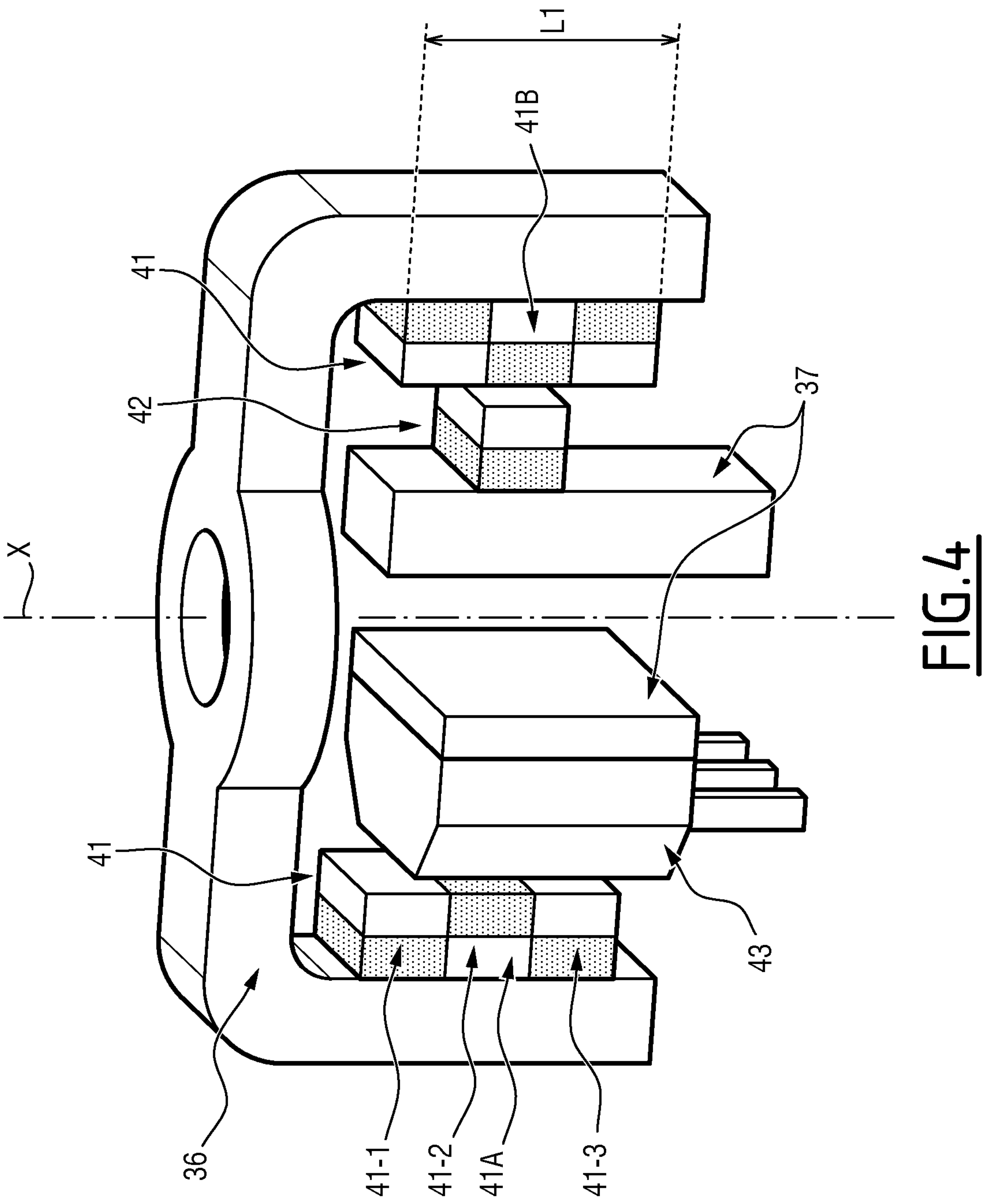
FIG. 4 is a perspective view of the functional internal elements of the fixed body and of the movable body shown in FIG. 1, said elements comprising in particular a magnetic element.

The interconnection element 32 is rigidly linked to the cover 31. The interconnection element 32 comprises a movable support 36 for holding functional internal elements inside the movable body 21, as will be explained in detail thereafter. The movable support 36 has e.g. a magnetic or ferromagnetic part and is e.g. in the shape of an arc or of a "U" overhanging the fixed body 22 or at least some internal elements thereof, as illustrated in FIG. 4. In particular, as illustrated in FIGS. 3 and 4, the movable support 36 can have two attachment arms extending substantially along the axis of movement X and a connecting piece extending substantially perpendicular to the axis of movement X for connecting the two attachment arms.

The fixed body 22 is used for cooperating with the movable body 21 via the linking means so as to provide the movement of the movable body 21 along the axis of movement X. The fixed body 22 comprises a fixed support 37 (visible in FIG. 3) apt to support at least some of the functional internal elements cooperating with the functional internal elements of the movable body 21, as will be explained in greater detail thereafter. More particularly, and as will be apparent hereinafter, the functional internal elements of the fixed body 22 are held by the fixed support 37 at a distance from same of the movable body 21. The fixed support 37 has e.g. one or a plurality of magnetic or ferromagnetic parts extending along the axis of movement X.

The fixed body 22 further comprises an attachment surface 38 for attaching the button 10, e.g. to an instrument panel of the aircraft. The attachment surface 38 further defines e.g. at least one contact pair for transmitting electrical signals between the button 10 and the corresponding avionic system.

According to different embodiments, the movable body 21 and/or the fixed body 22 can further comprise a travel stop for each end of travel during the movement along the axis of movement X. Each stop can be mechanical (i.e. mechanical contact) or magnetic (via the use of repulsive magnets at the end of travel, e.g.).

In reference to FIG. 4, the functional internal elements of the movable body 21 comprise a magnetic element 41 and the functional internal elements of the fixed body 22 comprise at least one notching tooth 42 apt to cooperate with the magnetic element 41 of the movable body 21 and at least one magnetic detector 43 apt to generate measurements quantifying each movement of the movable body 21 along the axis of movement X.

The magnetic element 41 has an axial magnetic alternation and is attached onto the movable support 36. The magnetic element 41 can have any suitable shape such as e.g. a ring, a parallelepiped or a cylinder or a portion of a ring with an axial or radial magnetization. Furthermore, the magnetic element 41 can have only one part or a plurality of distinct parts.

In the example shown in FIG. 4, the magnetic element 41 is in the form of two substantially identical parts 41A, 41B arranged opposite each other symmetrically with respect to the axis of movement X. Each of the parts 41A, 41B is held by the corresponding attachment arm of the movable support 36. In the same figure, each part 41A, 41B has a parallelepiped shape extending along the axis of movement X.

In order to ensure a magnetic alternation along the axis of movement X, the magnetic element 41 and, if appropriate, each distinct part 41A, 41B thereof, has a plurality of elementary magnetic parts arranged side by side, e.g. by bonding. Each elementary part has e.g. a parallelepiped shape or, in the case of an annular shape of the magnetic element 41, a ring or an arc of a ring. Each elementary part has e.g. a conventional permanent magnet or a magnet derived from a “polymagnets” or a “programmable magnet” called Polymagnets®. In the example shown in FIG. 4, each part 41A, 41B of the magnetic element 41 has three parallelepiped elementary parts 41-1, 41-2, 41-3 bonded to each other along the axis of movement X. Each of the elementary parts 41-1, 41-2, 41-3 has a permanent magnet defining the N pole and the S pole The parts are arranged along the axis of movement X so as to form an alternation of N pole and S pole along the X axis. In other words, in such a case, each elementary part has a radial magnetization.

In a generic case, a radial magnetization is achieved by arranging each elementary part next to each other along the axis of movement so that adjacent elementary parts are magnetized in opposite directions along the radial direction. Such arrangement of the elementary parts forms a diagram D1 of the magnetic fluxes illustrated in FIG. 5 in the case of five elementary parts.

Figure 5:
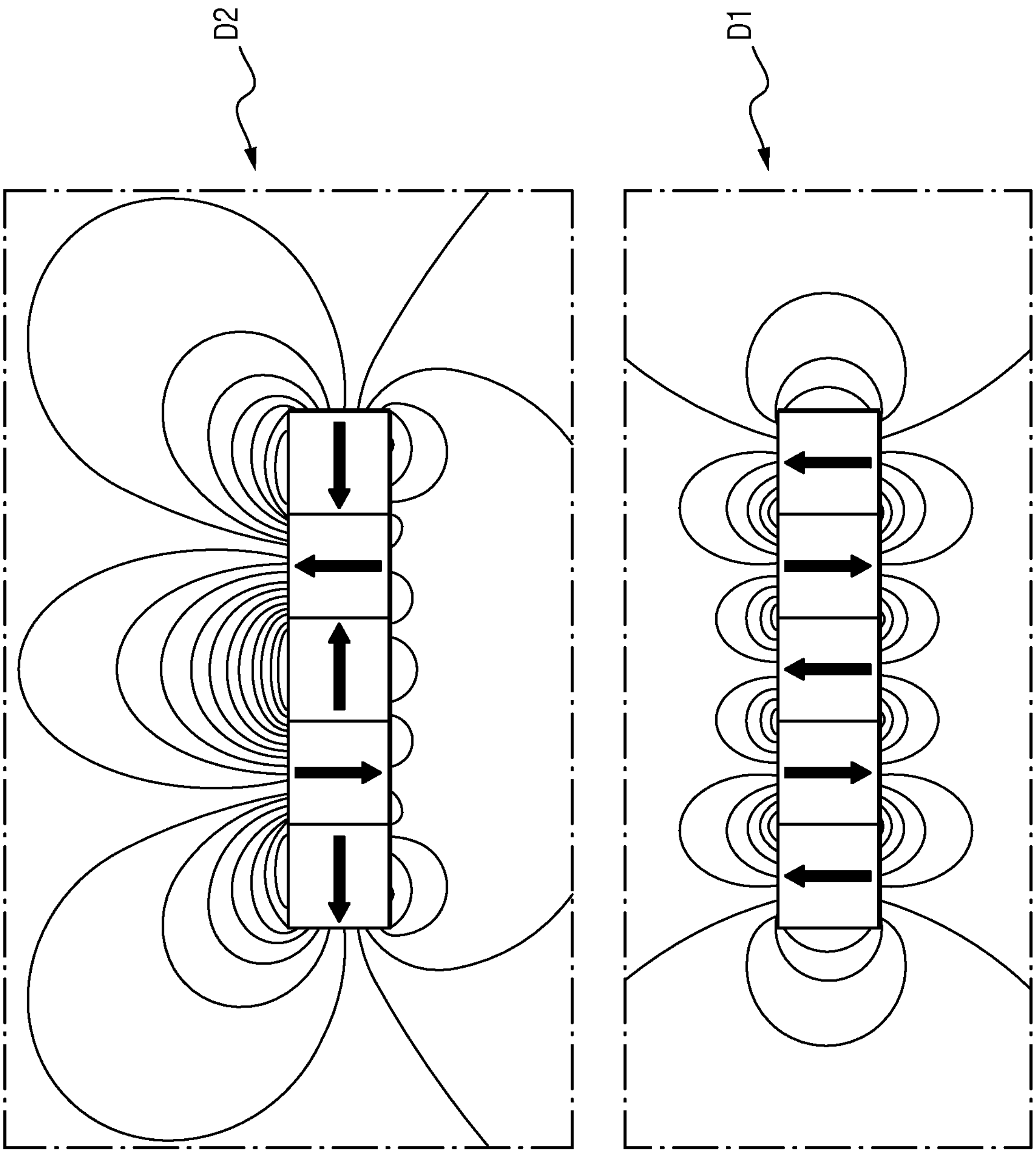
FIG. 5 is a magnetic radiation pattern according to different examples of internal layout of the magnetic element shown in FIG. 4.

According to another example of possible arrangement, an axial magnetic alternation is achieved by using a Halbach type arrangement, a diagram D2 of the magnetic fluxes of which is also illustrated in FIG. 5. In particular, according to such a type of arrangement, the elementary parts are magnetized alternately in the radial and axial directions. Moreover, the direction of magnetization of each elementary part is chosen so as to concentrate the magnetic field on the surface of the magnetic element 41 facing the functional internal elements of the fixed body 22.

The magnetic element 41 and, if appropriate, each of the parts 41A, 41B thereof have a length L1 corresponding to the extent thereof along the axis of movement X. The length L1 defines the extent of the travel of the movable body 21. Such extent is advantageously greater than 0.9 mm. The length L1 is formed by a sum of the widths of the elementary parts forming the magnetic element 41. The width of each elementary piece forms a notching pitch. According to one embodiment, the elementary parts have the same width. In such a case, the magnetic element 41 has a homogeneous notching pitch.

In the example shown in FIG. 5, three elementary parts are arranged successively along the axis of movement X. Among the elementary parts one part is arranged between the other two elementary parts. One part is then called the central part and the other elementary parts are called peripheral parts. The central part then has a central notch and the peripheral parts have peripheral notches.

As illustrated in FIG. 4, the magnetic detector 43 is mounted on one of the parts forming the fixed support 37 facing at least one of the parts of the magnetic element 41. The magnetic detector 43 quantifies the displacement of the magnetic element 41 along the axis of movement X. In other words, the detector 43 codes each displacement of the magnetic element 41 along the axis of movement X by detecting changes in the magnetic flux due to the axial magnetic alternation of the elementary parts forming the magnetic element 41.

The magnetic detector 43 has e.g. a Hall effect sensor or a magnetoresistive sensor or a solenoid. Furthermore, the magnetic detector 43 is connected to an external controller of the button 10 by cables 44 which are visible in FIG. 3, and apt to deliver to the external controller, electrical signals quantifying the change in the magnetic field in the vicinity of the detector 43. Such signals form a detection profile for the button activation. The profile comprises at least one activation point corresponding to the detection of activation of the button 10, i.e. a particular value of the change in the magnetic field for which the button 10 is considered to be activated.

The notching tooth 42 is mounted on the fixed support 37, e.g. on a part of the support 37 distinct from the part supporting the detector 43. The notching tooth 42 is mounted facing at least a part of the magnetic element 41. In particular, the notching tooth 42 is mounted facing at least a part of the magnetic element 41 with respect to a plane parallel to the axis of movement X. In particular, in the example shown in FIG. 4, the notching tooth 42 and the magnetic detector 43 are arranged opposite the different parts 41A, 41B of the magnetic element 41. The notching tooth 42 has a surface which is oriented towards the magnetic element 41 and has a dimension along the axis of movement X less than or equal to the notching pitch defined by the magnetic element 41. The notching tooth 42 is made of a ferromagnetic or magnetic material such as stainless-steel series 400. The notching tooth 42 is preferentially a magnet. The notching tooth 42 is e.g. a parallelepiped magnet or a magnet in the shape of an arc of a circle. Such a magnet is e.g. derived from a “polymagnet” or a “programmable magnet” called Polymagnets®.

The distance between the notching tooth 42 and the corresponding part of the magnetic element 41 is suitable for providing a necessary push force. Such a force along the axis of movement X is comprised e.g. between 0.5 and 20 N and advantageously equal to 5 N. The push force can also be adapted by adapting the number of notching teeth along the axis of movement X and/or about the axis of movement X. Furthermore, advantageously according to the invention, the notching tooth 42 is in the stable position when same is arranged opposite the central notch, i.e. facing the elementary part 41-2 of the magnetic element 41 in the example shown in FIG. 4. In order to ensure such a stable position, the surface facing the notching tooth 42 has a magnetization opposite to that of the surface facing the corresponding elementary part 41-2 of 41B.

It is clear that the pushing force is variable as a function of the respective positions of the or each notching tooth 42 with respect to the magnetic element 41. For at least one particular respective position of such elements, the push force has a peak. Advantageously, according to the invention, the activation point in the detection profile of the magnetic detector or detectors 43 is chosen as a function of the peak of the push force. More particularly, the activation point is advantageously offset with respect to the peak of the push force so that the activation of the button is detected after the peak. To achieve such an offset, the magnetic detector 43 can be slightly offset along the axis of movement X with respect to the notching tooth 42.

Figure 6:
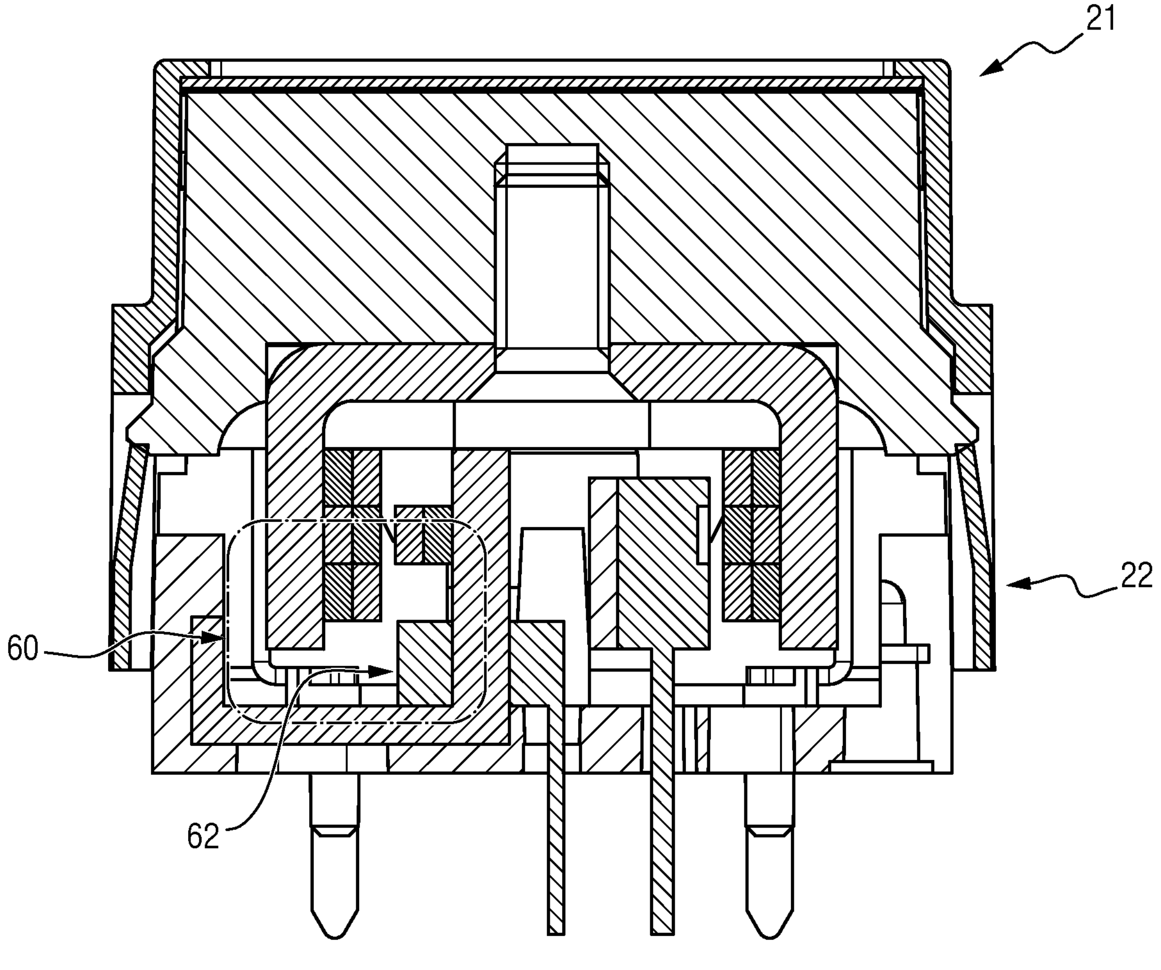
FIG. 6 is a view similar to the view shown in FIG. 3 of a push-button according to another example of embodiment.

FIG. 6 shows another example of embodiment of the button 10. According to said example, the button 10 further comprises a supplementary force controller 60 for controlling the push force more along the axis of movement X. The controller 60 comprises in particular a magnetic coil 62 integrated into the fixed body 22 and apt to generate a magnetic field made for interacting with the ferromagnetic or magnetic part of the movable body 21 such as the movable support 36, and/or with the magnetic element 41 of the movable body 21.

In the example shown in the same figure, the button 10 can further comprise at least one functional element chosen from the list comprising:

an element of visual feedback;

a presence sensor;

a haptic actuator.

Such a functional element is e.g. integrated into the visible surface 35 of the cover 31 and/or housed in the cavities of the interconnection element 32 illustrated in FIG. 2.

Figure 7:
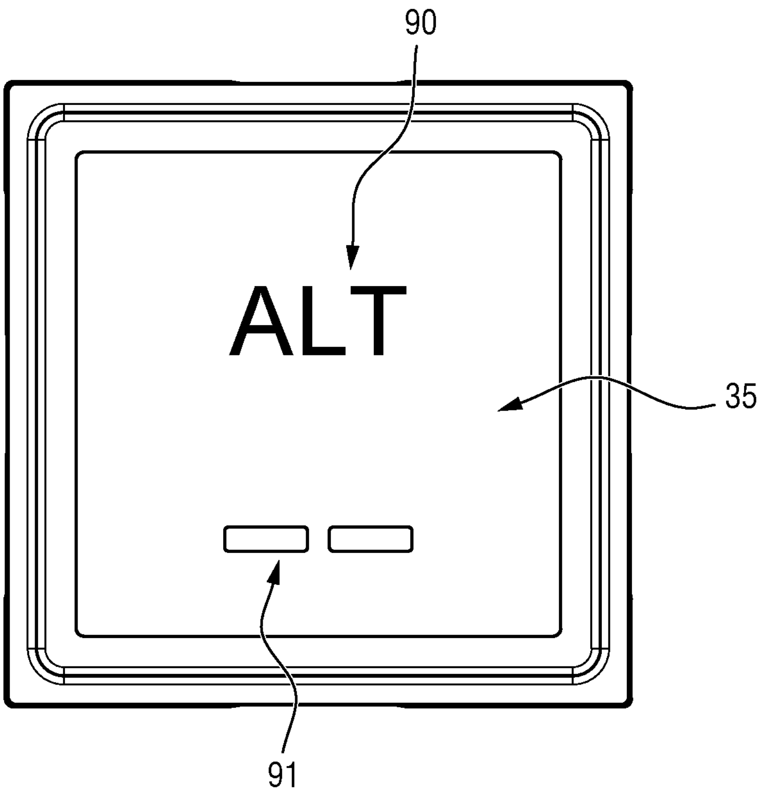
FIG. 7 is a top view of the push-button shown in FIG. 6.

In the example shown in FIG. 7, an element of visual feedback 90 is integrated on the visible surface 35. The element of visual feedback 90 can e.g. comprise an indicator indicating e.g. the function of the button 10 or an annunciator panel 91 indicating the validation of the control or any other ambient light.

The ambient light can e.g. be connected to the rest of the cockpit, for creating an harmony for improving the aesthetic appearance of the button 10. Indeed, the light identification in the event of an emergency or turbulence can be an asset from the point of view of the safety of the aircraft. Such lighting can be connected and synchronized with the rest of the cockpit. In such case, the light could change color depending on the context during the flight e.g. red flashing in emergency situations.

When the functional element comprises a presence sensor, same can be integrated into the button 10 for activating additional functions and/or for detecting finger positions on the button. E.g. the function of the button 10 can be modified according to the number of fingers placed on the visible surface 35.

When the functional element comprises a haptic actuator, the latter is preferentially placed at the end of the button 10 so as to improve the haptic sensation felt by the user. Same can have a piezoelectric actuator or an unbalanced vibration motor preferentially rigidly attached to the fixed body 22. The actuator can also be an electromagnetic actuator and act between the fixed body 22 and the movable body 21. The electromagnetic actuator can use a winding or a coil rigidly attached to the fixed body 22 which generates a magnetic field which attracts or repels a ferromagnetic or magnetic part along the axis of movement X.

Of course, at least one of the aforementioned functional elements can also be arranged in the button 10 without necessarily the supplementary force controller 60. Finally, it should be understood that the notion of a first body with all associated elements can be applied to a fixed body and the notion of a second body with all associated elements can be applied to a movable body.

Second Embodiment

The second embodiment will henceforth be explained with reference to FIGS. 8 to 10. Elements similar to the first embodiment are indicated in said figures by the same references and will not be detailed hereinbelow.

Figure 8:
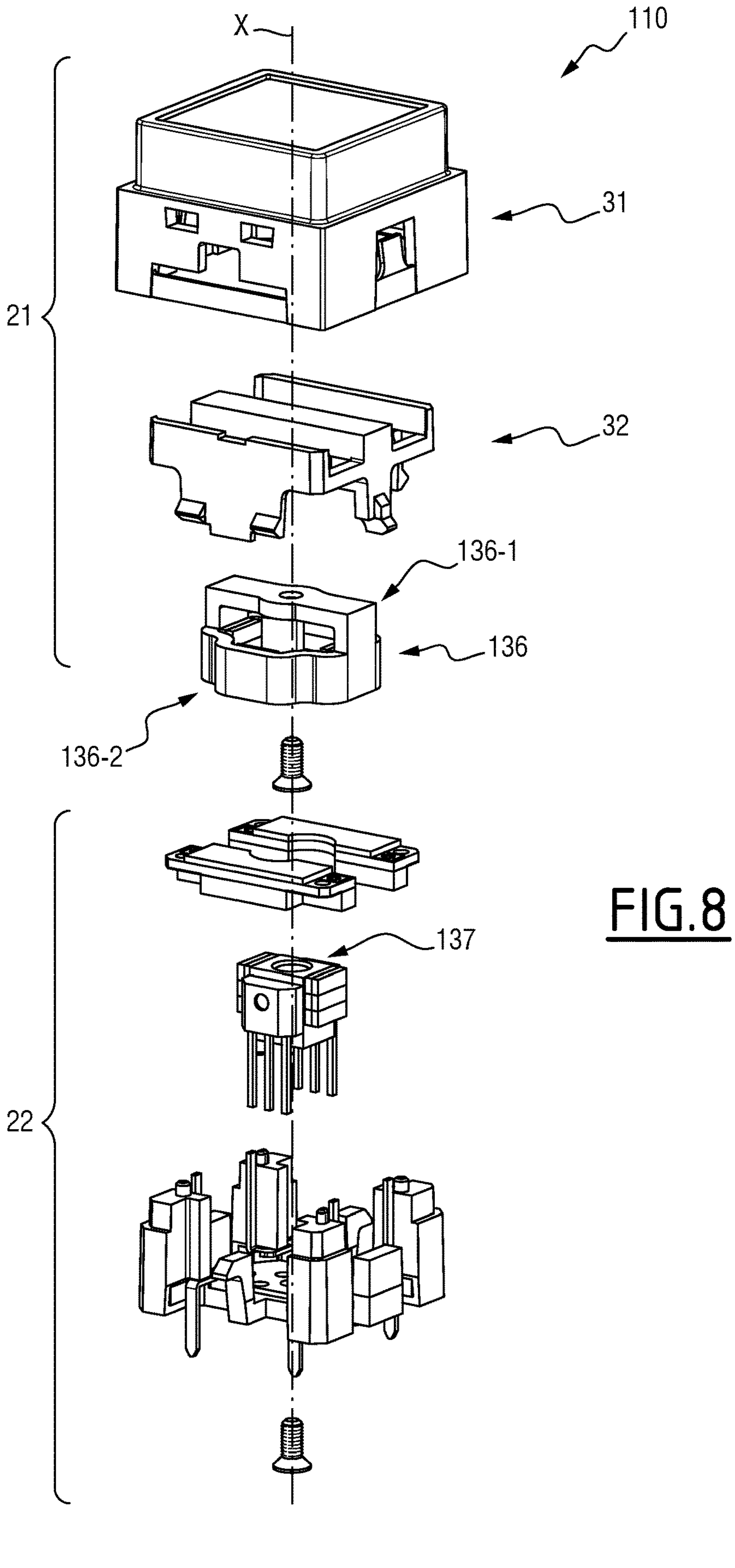
FIG. 8 is a view similar to the view shown in FIG. 2, the push-button being according to a second embodiment of the invention.

In particular, and as illustrated in FIG. 8, the interconnection element 32 comprises a movable support 136 which is different from the movable support 36 explained hereinabove. More particularly, the movable support 136 is suitable for holding a magnetic element having a structure different from the magnetic element explained hereinabove. Thereby, the movable support 136 has a first part 136-1 in the form of an arc or a "U" which is analog to the movable support 36 explained hereinabove and a second part 136-2 which extends around the attachment arms of the first part 136-1. As in the previous case, each attachment arm receives a part 41A, 41B of the magnetic element. The parts 41A, 41B can be seen in FIG. 9 and are e.g. identical to the parts described hereinabove. However, unlike the previous case, each of the parts 41A, 41B is apt to cooperate with a dedicated notching tooth. Also unlike the previous case, the magnetic element according to the second embodiment further comprises two other parts 41C, 41D arranged e.g. perpendicularly to each of the parts 41A, 41B. Each of the other parts 41C, 41D of the magnetic element is attached to the second part 136-2 of the movable support 136 and is apt to cooperate with a dedicated magnetic detector. Each part 41C, 41D can be analogous to each part 41A, 41B. According to one embodiment, the parts 41A to 41D are linked together and form e.g. a cylindrical shape of the magnetic element. According to another embodiment, the parts 41A to 41D are attached to the movable support 136 about the axis X.

According to the second embodiment, the fixed body 22 comprises a fixed support 137 having a hollow cylindrical shape extending along the axis X. In each transverse section, the fixed support 137 can present a polygon, the number of faces of which corresponds to the number of functional internal elements of the fixed body 22. In the example shown in FIGS. 8 to 10, the number is equal to 4 and the fixed support 137 thus shows a rectangle (e.g. square) in each cross section.

According to the second embodiment, the functional internal elements of the fixed body 22 comprise a plurality of notching teeth and/or a plurality of magnetic detectors. In the examples shown in the figures, the functional internal elements comprise two notching teeth 142A, 142B arranged opposite the parts 41A, 41B of the magnetic element and two magnetic detectors 143C, 143D arranged opposite the parts 41C, 41D of the magnetic element. The elements 41C, 41D, 143C, 143D are arranged on the corresponding faces of the fixed support 137 and are e.g. analogous to the elements described hereinabove.

In general, the magnetic detectors 143C, 143D and/or the notching teeth 142A, 142B can be arranged about the axis of movement X. Doubling or even tripling the magnetic detectors and/or the notching teeth improves the reliability of the device, especially in the case of an asymmetrical support, i.e. a support offset from the center of the button towards an edge. In the case of a plurality of magnetic detectors, the detection profile of the activation of the button 10 is formed e.g. by all the signals delivered by the detectors.

Furthermore, in the case of a plurality of magnetic detectors and/or teeth, said elements can be implemented according to different and dissimilar technologies, in order to meet a high DAL (e.g. DAL A). E.g., in the case of a plurality of magnetic detectors, the detectors can be dissimilar in order to make the detection more reliable.

Figure 10:
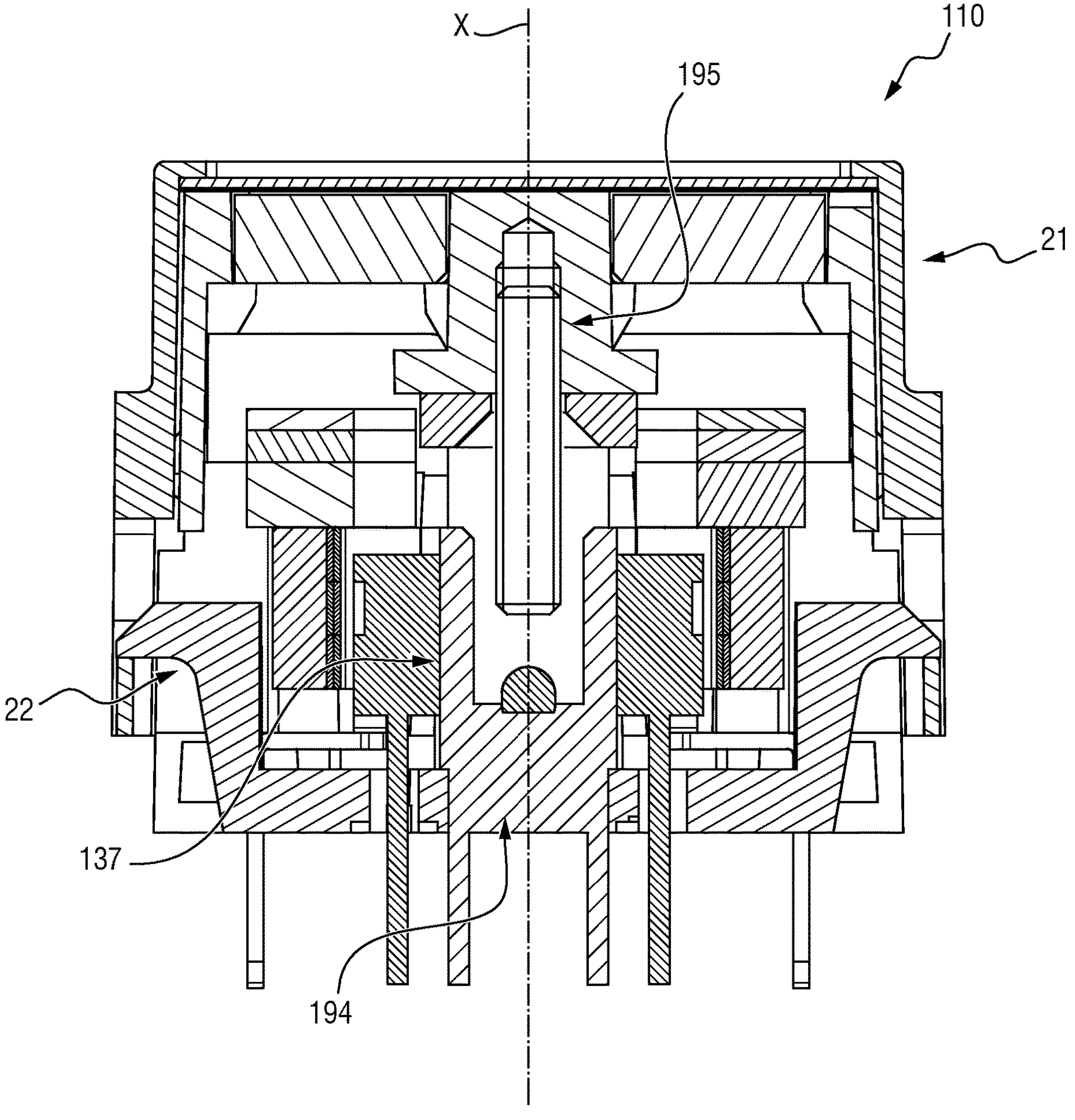
FIG. 10 is a section view of a push-button according to the second embodiment of the invention according to an example different from the example shown in FIG. 8.

FIG. 10 represents schematically another example of the button 110 according to the second embodiment. According to said example, the button 110 further comprises a switch 194 integrated into the center of the fixed body 22 (advantageously in the hollow part of the fixed support 137) and a rod 195 rigidly attached to the movable body 21 and configured for cooperating with the switch 194 during the movement of the movable body 21 along the axis X. More particularly, the rod 195 is configured for cooperating with the switch 194 when the button 110 is pressed. The switch 194 thus has a means which is redundant with regard to the magnetic detectors, used for detecting a pressing on the button 110.

Advantageously, the switch 194 is implemented according to a technology which is dissimilar to magnetic detectors. The is e.g. electromechanical or opto-mechanical. Preferentially, the switch detects a pressure during a mechanical contact with the rod 195.

Of course, the switch 194 and the rod 195 can also be implemented in the first embodiment.

The invention claimed is:

1. A magnetic push-button comprising a fixed body and a movable body, movable relative to the fixed body along an axis of movement;

one of the bodies, called first body, comprising:

a magnetic element extending along the axis of movement and defining a magnetic alternation along the axis of movement;

the other body, called second body, comprising:

a notching tooth made of ferromagnetic or magnetic material arranged opposite the magnetic element with respect to a plane parallel to the axis of movement in order to generate a push force by magnetic cooperation with the magnetic element, during a movement of the movable body along the axis of movement;

a magnetic detector arranged opposite the magnetic element and configured for generating measurements quantifying each movement of the movable body along the axis of movement;

wherein the notching tooth and/or the magnetic element is mounted on a magnetic or ferromagnetic support.

2. The magnetic push-button according to claim 1, wherein:

the magnetic element defines at least one central notch and two peripheral notches; and a position which is stable in translation is defined when the notching tooth is arranged opposite the central notch.

3. The magnetic push-button according to claim 1, wherein the magnetic alternation of the magnetic element defines a notching pitch.

4. The magnetic push-button according to claim 3, wherein the surface of the notching tooth has an extent less than or equal to the notching pitch of the magnetic element.

5. The magnetic push-button according to claim 1, having a detection profile for the button activation according to the measurements generated by the magnetic sensor;

said detection profile comprising a detection of activation of the button with an offset with respect to a peak of the push force generated by magnetic cooperation of the magnetic element with the notching tooth.

6. The magnetic push-button according to claim 5, wherein said offset in the detection profile is achieved by an offset along the axis of movement of the magnetic sensor and of the notching tooth.

7. The magnetic push-button according to claim 1, wherein the second body comprises a plurality of notching teeth and/or a plurality of magnetic sensors distributed equidistantly along the axis of movement and/or about the axis of movement.

8. The magnetic push-button according to claim 1, wherein the first body is the movable body and the second body is the fixed body.

9. The magnetic push-button according to claim 1, further comprising a travel stop for each end of travel during the movement along the axis of movement.

10. The magnetic push-button according to claim 1, further comprising a surface intended for being oriented towards an operator;

the surface comprising at least one functional element selected from the list comprising:

an element of visual feedback;

a presence sensor;

a haptic actuator.

11. The magnetic push-button according to claim 1, further comprising a supplementary force controller comprising an electromagnetic coil rigidly attached to one of the bodies and configured for acting on the or each notching tooth and/or on the magnetic element and/or on a ferromagnetic or magnetic support.

12. The magnetic push-button according to claim 1, further comprising an additional electromechanical or opto-mechanical switch placed in the center of the second body and configured for being activated by a rod rigidly attached to the first body.

13. A magnetic push-button comprising a fixed body and a movable body, movable relative to the fixed body along an axis of movement;

one of the bodies, called first body, comprising:

a magnetic element extending along the axis of movement and defining a magnetic alternation along the axis of movement;

the other body, called second body, comprising:

a notching tooth made of ferromagnetic or magnetic material arranged opposite the magnetic element with respect to a plane parallel to the axis of movement in order to generate a push force by magnetic cooperation with the magnetic element, during a movement of the movable body along the axis of movement;

a magnetic detector arranged opposite the magnetic element and configured for generating measurements quantifying each movement of the movable body along the axis of movement;

wherein:

the magnetic element defines at least one central notch and two peripheral notches; and a position which is stable in translation is defined when the notching tooth is arranged opposite the central notch.

14. A magnetic push-button comprising a fixed body and a movable body, movable relative to the fixed body along an axis of movement;

one of the bodies, called first body, comprising:

a magnetic element extending along the axis of movement and defining a magnetic alternation along the axis of movement;

the other body, called second body, comprising:

a notching tooth made of ferromagnetic or magnetic material arranged opposite the magnetic element with respect to a plane parallel to the axis of movement in order to generate a push force by magnetic cooperation with the magnetic element, during a movement of the movable body along the axis of movement;

a magnetic detector arranged opposite the magnetic element and configured for generating measurements quantifying each movement of the movable body along the axis of movement;

wherein said magnetic push-button has a detection profile for the button activation according to the measurements generated by the magnetic sensor;

said detection profile comprising a detection of activation of the button with an offset with respect to a peak of the push force generated by magnetic cooperation of the magnetic element with the notching tooth.

* * * * *